Aug. 1, 1967 C. E. EVEREST 3,334,353
OSCILLOGRAPH USING A LASER AND HEATED PLATEN
Filed June 24, 1965
2 Sheets-Sheet 1

INVENTOR.
CHARLES EUGENE EVEREST
BY
Christie, Parker & Hale
ATTORNEYS.

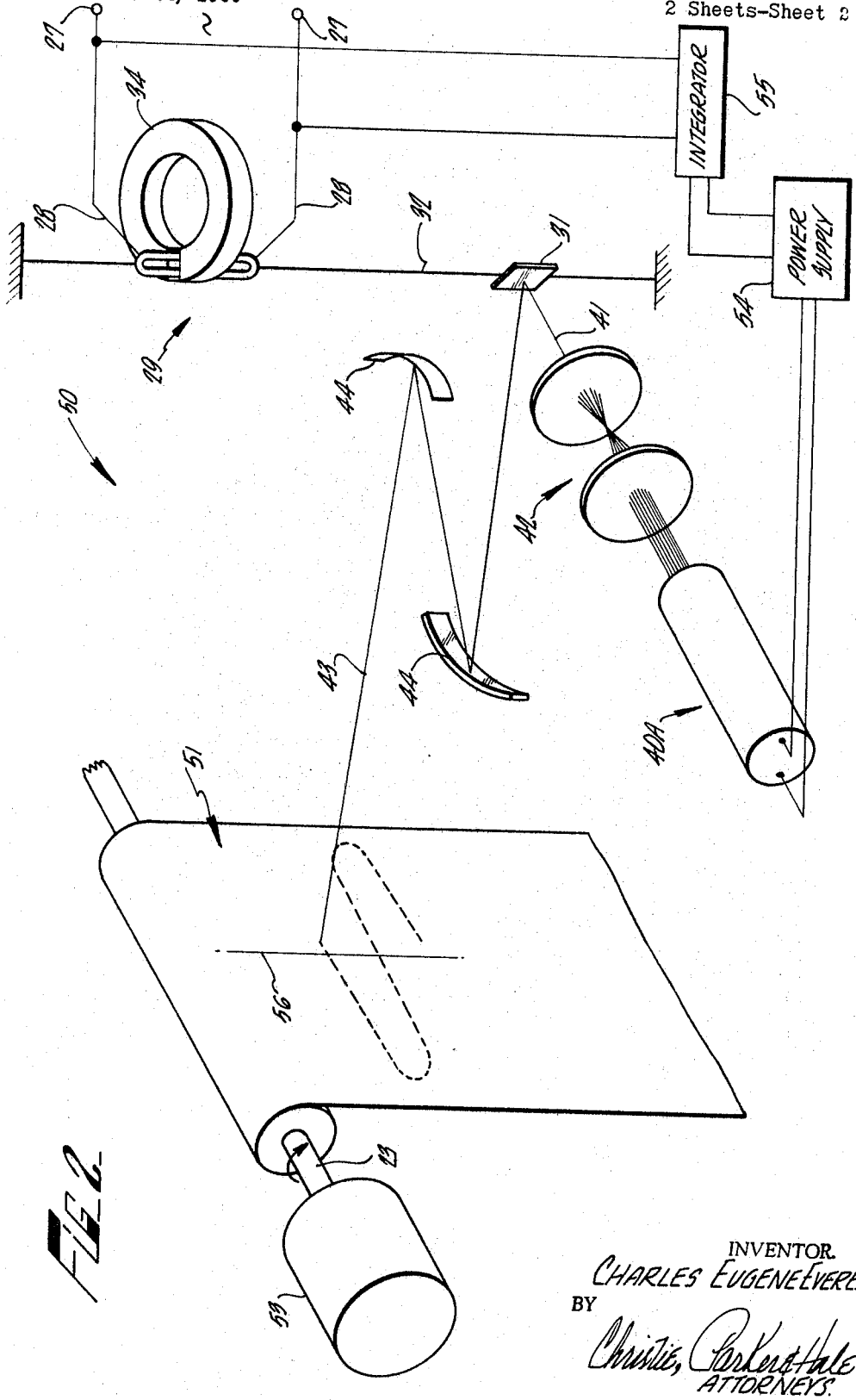

3,334,353
OSCILLOGRAPH USING A LASER AND
HEATED PLATEN
Charles Eugene Everest, Palos Verdes Peninsula, Calif., assignor to Consolidated Electrodynamics Corporation, Pasadena, Calif., a corporation of California
Filed June 24, 1965, Ser. No. 466,714
7 Claims. (Cl. 346—76)

ABSTRACT OF THE DISCLOSURE

An optical oscillograph in which the light source is a laser, and the recording medium is passed over a heated platen for preheating the medium to a temperature just below the threshold of the temperature range in which the medium discolors, the thermal energy added to the preheated medium by the laser beam being sufficient to heat the medium above the threshold and to produce a visible trace of the information applied to the oscillograph.

---

Figure 1:
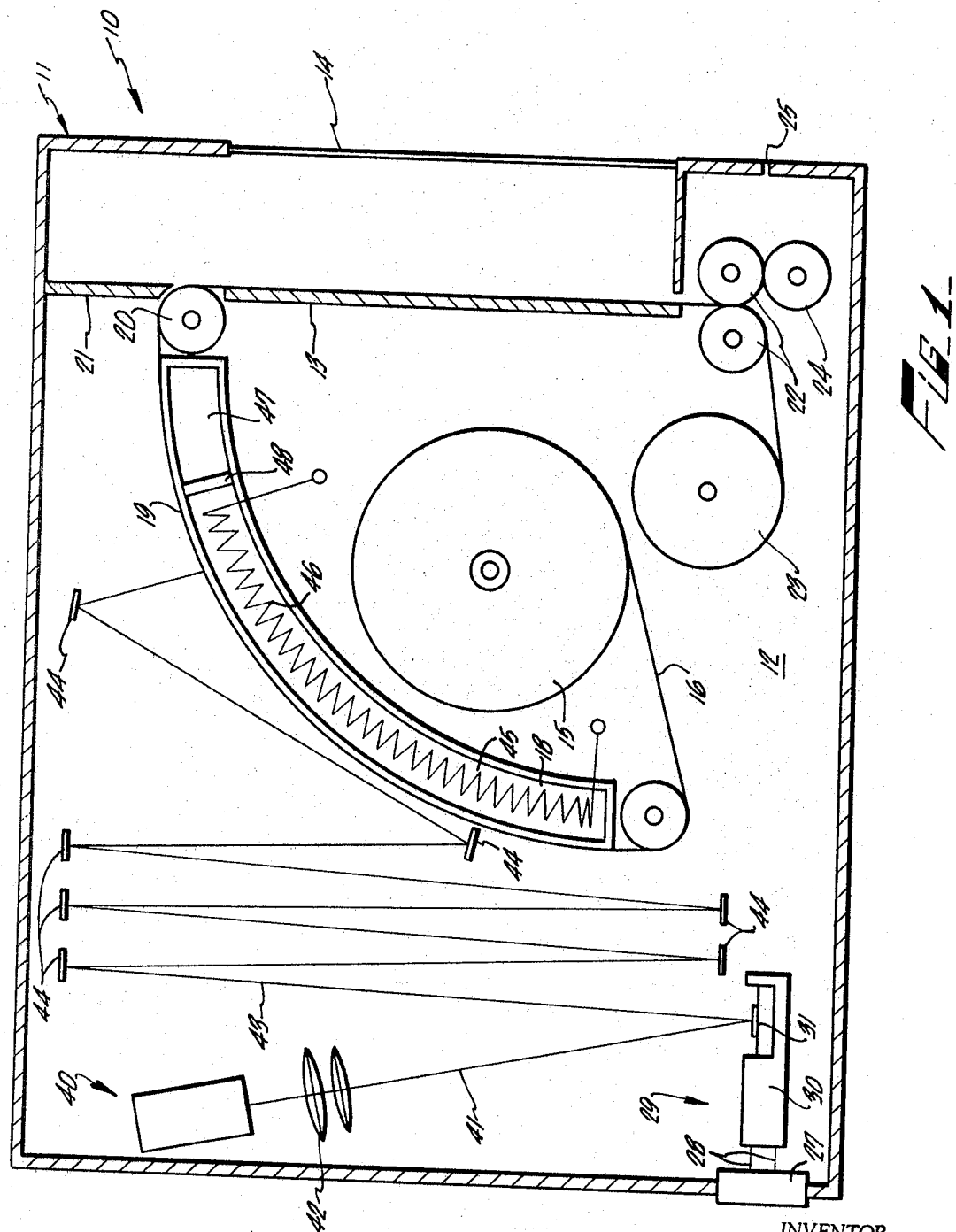

This invention relates to oscillography, and, more particularly, to oscillographs which include a laser as the source of a beam of radiation which is used to record a representation of variations in an oscillograph input signal upon a sensitized moving medium.

Recording oscillographs are presently either of the heat-writing type or the light-writing type. In a heat-writing oscillograph, a heated stylus is moved across the surface of a moving record which is provided with a heat-sensitive coating. The coating may be either a starch which is burned off to expose a contrastingly colored supporting substrate, or a thermoplastic material such as wax which usually is deformed by the heated stylus. The stylus is moved across the heat sensitive medium in response to an input signal applied to the device. Light-writing oscillographs conventionally use a mercury-arc light source, the light from which is focused upon a mirror coupled to the coil of a galvanometer to which the input signal is applied. The mirror moves in response to variations in the input signal to deflect the light incident thereon. The deflected light beam moves across the surface of a photo-sensitive recording medium. The latent image of the beam is rendered visible either by a dry development process or by more conventional wet development processes.

One of the limitations of existing oscillographs is the inability of these devices to accurately respond to high frequency variations in the input signal applied to the oscillograph. Heat-writing devices must be operated at low frequencies because of the inertia present in the mechanism provided for moving the heated stylus. Light-writing devices are also limited by the inertia of the galvanometer movement, but principally they are limited by the amount of light required to produce an acceptable signal trace on the light-sensitive recording medium. When the input signal varies at high frequency, the light spot produced by incidence of the deflected light beam on the medium moves across the medium too fast to adequately expose the medium. The problem is compounded at very high frequencies because of the light losses produced by the additional optics which must be used to obtain an acceptable peak-to-peak amplitude in the recorded signal trace; additional optics, usually mirrors, are required because the angular movement of the galvanometer mirror decreases as the input signal frequency increases.

This invention enables the use of high writing speeds in heat-writing and light-writing oscillographs. By its use, the heated stylus now required in heat-writing oscillographs is eliminated. To obtain these advantages a laser is used. The light beam emitted by the laser is used to activate a moving recording medium sensitized to heat and/or to light.

Generally speaking, this invention provides an oscillograph which includes a moving recording medium upon which are recorded representations of the variations with time in an oscillograph input signal. A laser, emitting an intense beam of light, is provided, together with means for directing the beam along a predetermined path to the recording medium for incidence thereon. Means operable in response to the input signal are disposed in the path for deflecting the beam laterally of the path an amount related to the difference between the instantaneous value of the signal and a reference value of the signal. The oscillograph also includes means receiving the input signal and applying it to the deflecting means.

The term "laser," as used in this specification, is an acronym for Light Amplification by Stimulated Emission of Radiation. The active element of the laser may be any gas, crystal, or semiconductor emitting coherent light as excited electrons therein change energy levels. The radiation emitted by such devices is known as "light," but this term includes both visible and invisible electromagnetic radiation such as infrared or ultraviolet radiation.

The above-mentioned and other features of the invention are more fully set forth in the following description presented with reference to the accompanying drawing wherein:

FIG. 1 is a cross-sectional elevation view of an oscillograph according to this invention; and FIG. 2 is an exploded perspective view of another oscillograph according to this invention.

An oscillograph 10, shown in FIG. 1, includes a housing 11 having an internal chamber 12, a record display board 13, and a record viewing window 14 adjacent the display board. A roll 15 of recording medium or record sheet 16 is rotatably mounted in the housing. The term "record" is used herein interchangeably with "recording medium" and refers to the sheet or strip upon which evidence of an event is contained. Record 16 is passed over a guide roller 17 to a record support platen 18 having a convex surface 19 which defines a portion of the path the record follows in its movement through the oscillograph. As the record leaves the platen it passes between a guide roller 20 and a light baffle 21 and then over the surface of display board 13 which opens toward window 14. The record then passes between a pair of idler rollers 22 to a take-up roller 23; alternatively, the record can be passed between a driven roller 24 and one of rollers 22 and out a discharge slot 25 instead of to the take-up roller, if desired.

A terminal block 27 is mounted to the end of the housing opposite from window 14 so that the oscillograph may be coupled to a pair of conductors (not shown) over which an oscillograph input signal is supplied from a source of input signals. The terminal block is connected by a pair of conductors 28 to a galvanometer 29 having a case 30 and a mirror 31. As shown in FIG. 2, the mirror is supported on a wire 32 which mounts a galvanometer coil 33 (to which conductors 28 are connected) disposed in the magnetic field produced by a magnet 34.

A laser 40 is mounted in chamber 12 and emits an intense beam 41 of coherent light. Beam 41 is focused by a lens system 42 into a spot on galvanometer mirror 31. The galvanometer mirror moves in response to variations in current flow through coil 33 (i.e., in response to variations in the input signal) so that beam 41 is deflected from the path it normally follows were mirror 31 stationary. A deflected beam 43 is directed to record 16. The laser and galvanometer are arranged so that the deflected beam moves across the record transversely of the direction of record movement.

Oscillograph 10 is adapted for high frequency applications and contains a plurality of mirrors 44 which provide a long optical arm in and between the galvanometer mirror and record 16. The best galvanometers now available produce a peak-to-peak movement of the deflected beam of 0.27 inch when operated at 30 kc. for a 11.5 inch optical arm. Mirrors 44 increase the optical arm so that the peak-to-peak amplitude of the trace recorded on record 16 is acceptable and easily read. The increased optical arm means that the light spot produced by beam 43 on the record moves very rapidly across the record. The beam is so intense, however, that it still has the desired effect upon the record, notwithstanding the fact that the intensity of the beam is decreased somewhat each time it passes through a lens or is reflected from a mirror. For example, if only 15% of the output of a silicon carbide electron-injection laser were delivered to the record in a spot 10 mils by 10 mils in size, the light intensity delivered to the record is 100 times the intensity delivered to a like area from a mercury arc lamp when light from such a lamp is passed through a five-foot folded optical arm wherein the light loss is 70% of the light introduced to the folded arm.

For low frequency applications, mirrors 44 can be deleted and light beam 43 can be passed directly to the record. The galvanometer mirror, in such a case, is spherically curved to focus the light reflected from it to a small spot on the record.

An indicated above, record 16 may be either heat sensitive or light sensitive. Many light sensitive oscillograph records in use today also require that the record be heated during exposure to increase the photo-sensitivity of the record, especially where high frequency variations in the input signal are to be recorded. Accordingly, platen 18 has a first portion 45 which includes a heater 46. If record 16 is a heat-sensitive medium such that a predetermined amount of thermal energy must be imparted to it to produce an image, then heater 46 is operated to impart to the moving record an amount of thermal energy a selected amount less than the predetermined amount required to produce an image. The selected amount differs from the predetermined amount by an amount less than the amount of heat added to the paper from incident beam 43. It will be understood that the magnitude of the selected amount is a function of record speed and the average speed at which the incident light beam moves across the record.

Platen 18 also has a cold portion 47, separated from heated portion 45 by thermal insulation 48, over which the record passes as it leaves heated portion 45 after exposure to beam 43. The temperature of the record is reduced by the cold portion of the platen to stabilize the record after a representation of input signal variations are recorded thereon.

Laser 40 preferably operates continuously, although it is within the scope of this invention to operate the laser in a pulsed mode. Some of the known materials which may be used for continuous laser operation are chromium using aluminum oxide as the host material, neodymium using various fluorides as a heat material, neodymium doped calcium tungstate, molybdates with glass, dyprosium with calcium fluoride, or uranium with various fluorides. The invention also includes the use of gas discharge lasers, such as helium, neon, krypton, xenon, carbon monoxide, oxygen, or some of the semi-conductors such as gallium arsenide, indium phosphide, indium arsenide, or silicon carbide, the latter laser being an electron injection laser.

Where a light sensitive record is used, it is preferred that the laser emit light matching, as closely as possible, the peak light response of the record. For example, a silicon carbide electron injection laser emitting light at 4560 A. may be used advantageously with a record having a peak response to light at 4358 A.

FIG. 2 illustrates an oscillograph 50 which includes a galvanometer 29, a laser 40A, and a record 51. Record 51 is a sheet of ordinary paper upon which a trace 52 of input signal variations is produced by surface heating effects (charring) in the paper by deflected laser beam 43. FIG. 2 also shows a motor 53 for driving record take-up roller 23.

A power supply 54 is coupled to laser 40A for operating the laser. An integrator circuit 55 is coupled between oscillograph input terminals 27 and the power supply. The integrator regulates operation of the laser, via the power supply, so that the laser operation is pulsed at a frequency which varies as the time integral of the input signal variations. It will be understood, however, that this invention also includes the use of a differentiating circuit in lieu of the integrator circuit shown.

Presently available one-watt continuous wave lasers can produce 10 watt pulses when operated on a 10% duty cycle. The thermal energy present in short 10 watt laser beam pulses is sufficient to produce surface charring of ordinary paper. For example, a one microsecond pulse of 10 watt thermal energy is sufficient to char ordinary paper to a depth of .2 mil over an area of 3 mils square. A light spot which traces an 8 kc. sine wave of 4 inch peak-to-peak amplitude moves over the record at a speed varying from 160 inches per second to 100,000 inches per second during one cycle of the sine wave. If one microsecond laser beam pulses, pulsed 10 microseconds apart, were used to trace the sine wave, the trace would be unrecognizable where the spot moves fastest, i.e., where the trace erases the X axis, and the trace would be overdefined and unreadable where the spot moves slowest, i.e., at the peaks of the sinusoidal trace. Integrator 55, however, varies the frequency of laser pulsation so that the duty cycle of the laser is greatest when deflected beam 43 crosses the record X-axis (line 56 in FIG. 2), and is lowest when the beam traces the peak of a sine wave or the like. The average duty cycle of the laser during one cycle of input signal variation, however, is such that the laser is not overloaded, e.g., the average duty cycle is 10%.

The invention has been described above in the context of specific structures and parameters merely as a way of explaining certain presently preferred embodiments of the invention, and therefore the foregoing description is not to be considered as limiting the scope of this invention.

What is claimed is:

1. In an oscillograph including means for moving along a selected path a quantity of record material upon which is to be recorded a representation of the variations with time of an oscillograph input signal, means for emitting a beam of recording energy and for directing the beam along a predetermined path to the record material for incidence thereon, means operable in response to the input signal for deflecting the beam laterally of the selected path an amount related to the difference between the instantaneous value of the signal and a reference value thereof, and means receiving the input signal and applying it to the deflecting means, the improvement comprising, in combination, a platen having a surface defining a portion of the selected path and over which the material moves, wherein the material response to the application of heat thereto to provide a visible record of the areas thereof to which a predetermined amount of thermal energy has been applied and wherein said source is a laser and the recording energy is thermal energy, and means for heating the platen to a temperature which in cooperation with the speed of movement of the material over the platen surface imparts to the material an amount of thermal energy a selected amount less than said predetermined amount, the beam from the laser imparting to the material an amount of thermal energy greater than said selected amount to provide a visible trace of the beam on the material.

2. Apparatus according to claim 1 wherein the recording material carries a coating rendering the record material thermally sensitive so that when said predetermined amount of thermal energy is applied thereto the coating changes color to contrast with the areas of the coating to which said predetermined amount of thermal energy is not applied.

3. Apparatus according to claim 2 including means adjacent the platen and past which the record material moves from the platen for cooling the record material coating.

4. Apparatus according to claim 1 in which the record material comprises a strip of unsensitized paper.

5. Apparatus according to claim 1 including means coupled between the signal receiving means and the laser for pulsing operation of the laser at a frequency related to the instantaneous value of the input signal.

6. An oscillograph according to claim 5 wherein the means for pulsing laser operation is constructed to pulse the laser at a frequency proportional to the time derivative of the input signal.

7. An oscillograph according to claim 5 wherein the means for pulsing laser operation is constructed to pulse the laser at a frequency proportional to the integral of the input signal with respect to time.

References Cited

UNITED STATES PATENTS

| | | | |
|---|---|---|---|
| 2,958,010 | 10/1960 | Carter et al. | 346—109 XR |
| 3,006,713 | 10/1961 | Klein et al. | 346—108 |
| 3,073,215 | 1/1963 | Fischer | 346—109 |
| 3,140,145 | 7/1964 | Johnson | 346—109 |
| 3,148,612 | 9/1964 | Jacobs et al. | 346—76 XR |
| 3,154,371 | 10/1964 | Johnson | 346—108 |
| 3,256,524 | 6/1966 | Stauffer | 346—76 |

RICHARD B. WILKINSON, *Primary Examiner.*

J. W. HARTARY, *Assistant Examiner.*